United States Patent Office 3,367,907
Patented Feb. 6, 1968

---

3,367,907
STABILIZED POLYMERIC COMPOSITIONS
Ralph H. Hansen, Short Hills, N.J., assignor to Bell Telephone Laboratories Incorporated, New York, N.Y., a corporation of New York
No Drawing. Continuation of application Ser. No. 336,389, Jan. 8, 1964. This application Feb. 15, 1967, Ser. No. 616,417
1 Claim. (Cl. 260—45.8)

ABSTRACT OF THE DISCLOSURE

The subject matter of this application deals with stabilizers for polymers such as polypropylene to retard or inhibit oxidation promoted by the presence of copper. The stabilizing compounds include azimidobenzene, phenotriazine, and azimidobenzene compounds having substituents on the benzene ring. A principal field of use for polymers containing these inhibitors is for electrical insulation of copper conductors.

---

This is a continuation of application Ser. No. 336,389, filed Jan. 8, 1964, now abandoned, and relates to polyolefin compositions stabilized against degradation accelerated by the presence of copper. Such compositions are especially useful for electrical insulation of copper wires.

In the past much attention has been directed to the stabilization of polyethylene. It now appears that various of the higher order saturated hydrocarbon polymers are better adapted for certain uses. Specifically, polypropylene appears to be particularly promising for expanded wire insulation. It is tough, hard, sufficiently flexible, resistant to thermal embrittlement and stress cracking, high melting and quite insoluble in many ordinary solvents. However, accompanying these advantages are various factors hindering the use of these materials, notably their propensity toward thermal oxidation. These higher order polymers are easily oxidized due to the relatively high proportion of tertiary carbon atoms they contain in comparison with the almost linear materials such as the high density polyethylenes. Further, thermal oxidation of these polymers is catalyzed by metal ions. In view of this propensity toward thermal oxidation and the susceptibility to metal ion catalysis, the problem of oxidative degradation has been found to be particularly severe in higher order polymers. Specifically, it has been found that the limited useful life of polypropylene, even when stabilized with the best known antioxidant materials, makes it commercially prohibitive for many applications involving contact with copper. As primary electrical insulation for copper wires and cables, for instance, polypropylene becomes useless after a very few months. Accordingly, this invention is directed to stabilization of polypropylene and related polymers against thermal oxidative degradation accelerated by the presence of copper ions.

The polymers intended to be within the scope of this invention are polypropylene and other poly-α-olefins. Of particular interest are copolymers of ethylene and propylene especially those containing a predominant portion (60% to 98%) of propylene. Mixtures of polymers are also intended to be included as part of the polymeric class adapted to be stabilized by the composition of this invention. For the purposes of the invention a mixture or copolymer is considered to be within the scope of this invention as long as the predominant portion of its composition is polypropylene.

It is also intended that this invention encompass polymeric compositions containing minor proportions of additional ingredients such as fillers, coloring agents, inhibitors against ultraviolet degradation such as carbon black, etc. Of particular concern in this connection are compounds capable of expanding the polymer. As was stated previously, expanded polypropylene, if properly protected against copper poisoning with the inhibitor of this invention, is an excellent electrical insulation material. Expanded polymers serve other well known uses and are attractive because of their reduced cost. The stabilizing compositions according to this invention are fully compatible with known commercial blowing agents and nucleating agents and will not interfere with their blowing action.

The novel inhibitors against degradation due to copper according to a principal feature of this invention are azimidobenzene and derivatives of azimidobenzene which include the radical:

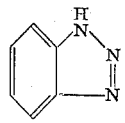

and the corresponding compounds having a six membered heterocyclic ring and are characterized by the phenotriazine structure:

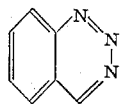

The following examples are offered to show that compounds including the structure defined above will be effective inhibitors when used according to the prescribed teachings of this invention. Each example gives a particular polymeric composition including the inhibitor of the class defined and additionally including a particular well known stabilizer against thermal oxidation. Each example gives the results of an accelerated oxidation test whereby the effective useful life of the polymer is measured. In every case the time in hours is that period during which the polymer retains its useful properties. According to this accelerated test procedure, it has been found that the point at which the polymer has effectively failed is that where the polymer has absorbed oxygen in the amount of 10 cc./gram of sample. Accordingly, each result reported is considered a measure of the failure point of the particular composition listed. As will be seen the group of materials tested as inhibitors represents a reasonable cross-section of azimidobenzene and phenotriazine compounds.

The accelerated aging tests were conducted substantially as follows:

Samples of the polymer containing the additives as indicated in each example were prepared in a Brabender Plastograph. The Brabender was heated to 205 to 210° C. A charge of 30 grams of resin was placed in the chamber and warmed for three minutes under a nitrogen atmosphere. The additives as desired were then added in amounts of 0.5% antioxidant, 0.5% inhibitor and 1.4% copper in the form of copper dust. This mixture was then mixed for seven minutes.

The copper dust used was prepared as follows:

Purified electrolytic grade copper was heated to a bright red color in the reducing flame of a Bunsen burner. While still bright red, the copper was quickly plunged into a beaker containing absolute alcohol. The alcohol was decanted and the copper dust was dried in a vacuum oven for a minimum of two hours at 60° C. The freshly-reduced copper was removed from the oven and the resultant clumps were broken up and added to the polymer.

The batch was then removed from the chamber, pressed flat to about 100 mils, and a portion molded in a polished aluminum picture frame mold to a thickness of 10 mils. Molding was accomplished at a temperature of about 175 to 180° C. and a pressure of between 1200 and 2000 p.s.i. The sample was kept at this temperature and pressure for one minute and then the mold was transferred to a cold press for cooling under pressure.

Accelerated thermal oxidation tests, in which the amount of oxygen reacting at atmospheric pressure with the sample in a closed system was measured volumetrically, were carried out at a temperature of 140° C. The reaction vessels consisted of Corning No. 459050 oxygen uptake pipets. Approximately 30 inches of transparent plastic tubing, used as a leveling tube was attached and the appropriate amount of mercury was added by filling through the plastic tubing. The tubing was clamped to restrict the flow of mercury and an inner tube, which contained the sample and enough Linde type 5–A molecular sieve (a zeolite resin) to absorb the $CO_2$ and $H_2O$ evolved during oxidation, was added.

In each case, the weight of the plastic sample used was 0.1 gram. The pipet was sealed under a steady flow of oxygen after first alternately evacuating and flushing with oxygen several times. The sealed pipet was then placed into a constant temperature bath maintained at the desired temperature and an initial volume reading was taken after about 15 minutes. The rate of reaction was followed by observing changes in the level of mercury in the sample pipet as compared with a control pipet (prepared in the same way except that it did not contain the polymer sample).

It has been noted that the physical properties (as evidenced by brittleness, lack of elongation, etc.) of polypropylene specimens deteriorated markedly after an oxygen uptake of 10 cc. per gram of polymer. Accordingly, time for failure of a test specimen is reported as the time when thermal oxidation has proceeded to this extent.

The results of the accelerated aging tests on various compositions of azimidobenzene and phenotriazine type inhibitors are contained in the following table. In each example 1.4% by weight of copper dust was added to polypropylene containing the designated additives.

TABLE I

| Example | Copper Inhibitor | Antioxidant | Useful Life Measured by Accelerated Aging (hrs.) |
| --- | --- | --- | --- |
| 1 | None | 0.5% Santonox-R [1] | 175 |
| 2 | 0.5% azimidobenzene. | do | 605 |
| 3 | 0.5% 5-chloroazimidobenzene. | do | 492 |
| 4 | 0.5% 5-methylazimidobenzene. | do | 715 |
| 5 | 0.5% 5-nitroazimidobenzene. | do | [2] 530 |
| 6 | 0.5% 5,6-dimethylazimidobenzene. | do | [2] 530 |
| 7 | 0.5% 1,2-azimidonaphthalene. | do | [2] 530 |
| 8 | 4-hydroxyphenotriazine. | do | 448 |
| 9 | None | N-phenyl-β-naphthylamine 0.5%. | 449 |
| 10 | 0.5% azimidobenzene. | do | 804 |
| 11 | None | 0.5% AN-25 [3] | 133 |
| 12 | 0.5% azimidobenzene. | 0.5% AN-25 | 226 |

[1] Santonox-R is the commercial name for: 4,4'-thiobis(3-methyl-6-tert. butylphenol).
[2] Experiment terminated before failure.
[3] AN-25 is the commercial name for: 6,6'-di-tert. butyl-4,4'-bi-o-cresol.

Example 1 is included as a control. From Example 2 it is evident that the addition of the copper inhibitor adds significantly to the useful life of the polymer. Examples 3 to 7 give data on the effectiveness of several representative substituted azimidobenzene compounds. Example 8 is directed to a typical substituted phenotriazine. Similar studies have shown these compounds to be effective in amounts of 0.1% to 5.0%. However, additions of greater than 5% of inhibitor begin to adversely affect other properties of the polymer, in particular, the dielectric property. The same has been found to be true for the amount of antioxidant added. The range 0.1% to 5% by weight is preferred in each case and is considered a "stabilizing amount."

Examples 9 to 12 show that similar effects obtain when using other known antioxidant stabilizers. This is expected since there is no hypothesized chemical interaction between the copper inhibitor and the antioxidant. The antioxidant continues to sreve its known function. The copper inhibitors act to pacify copper compounds which are formed in the polymer and which accelerate the degradation of the polymer. It has been found that the copper inhibitor alone contributes to the useful life of the copper-containing polymer. However the polymer, in the absence of an antioxidant, degrades so quickly that the collection of data similar to that of Table I is difficult.

While the data of Table I refers to polypropylene similar investigations have verified the same effects in mixtures and copolymers of polypropylene with such materials as polyethylene and polyisobutylene. For certain applications notably electrical wire insulation in which low temperatures are encountered propylene-ethylene copolymers have been found to be especially useful. Such uses in which the predominant portion of the copolymer (or mixture) is polypropylene are considered to be within the scope of the invention. Accordingly the reference to compositions "comprising polypropylene" includes such mixtures and copolymers.

The significance of the accelerated aging studies in terms of effective useful life under actual service conditions are found by extrapolating the effective period in hours obtained at 140° C. as set forth in the table to the expected life at the temperature designated for service use through an Arrhenius plot obtained at at least two temperatures. This method of interpreting accelerated test data is well known in the art and is necessary to prescribe or predict service performance in various desired uses. The extrapolated data for a typical stabilized polymer of this invention indicates that an effective period of stabilization in accelerated tests of 200 hours at 140° C. will clearly provide an effective stabilization period at 70° C. in excess of the common standard of 30 years.

The compositions of this invention are particularly adapted for use as primary insulation for electrical wire conductors. As such, expanded polypropylene has been found to be adequate in mechanical properties and is expected to be economical due to the savings in material cost as a result of expanding the polymer. This invention particularly includes wire insulation of the expanded type. The additives discussed herein are compatible for the processing involved. Known blowing agents such as azodicarbonamide are effective for this purpose.

The copper inhibitors described are the normal form of the compounds prescribed. However, it has been found that isomers of these compounds are equally effective. Thus the term azimidobenzene is intended to include pseudoazimidobenzene (in which the hydrogen atom is associated with the 2-nitrogen rather than the 1-nitrogen) and 1,2,4-benzotriazine is intended to be considered as an alternative form of phenotriazine (1,2,3-benzotriazine). Compounds defined as being characterized by the azimidobenzene or phenotriazine structure are to be construed as including substituted compounds including the structure of the basic compound.

Variations and modifications of the stabilizing composition of this inventioin will become apaprent to those skilled in the art. However, all such departures from this specification as are properly considered within the skill of the art and also within the basic concepts of the advance provided to the art by this invention, are to be also properly con-

What is claimed is:
1. A polymeric composition stabilized against degradation accelerated by the presence of copper comprising polypropylene in contact with copper, the polypropylene containing a stabilizing amount of an antioxidant and containing aproximately 0.1 percent to 5.0 percent by weight of a copper inhibitor selected from the group consisting of azimidobenzene, 5-chloroazimidobenzene, 5-methylazimidobenzene, 5-nitroazimidobenzene, 5,6-dimethylazimidobenzene, 1,2-azimidonaphthalene, and 4-hydroxyphenotriazine.

References Cited
UNITED STATES PATENTS

| | | | |
|---|---|---|---|
| 3,211,696 | 10/1965 | Coleman et al. | 260—45.8 |
| 3,231,541 | 1/1966 | Caldo | 260—45.8 X |

DONALD E. CZAJA, *Primary Examiner.*

W. J. WELSH, *Assistant Examiner.*